United States Patent [19]

Fujita et al.

[11] Patent Number: 5,077,784
[45] Date of Patent: Dec. 31, 1991

[54] VISIBLE TELEPHONE

[75] Inventors: Tsutomu Fujita, Gifu; Takeshi Ban, Figu; Yoshinobu Ido, Gifu; Masaaki Sugihara, Gifu; Tsuneyoshi Yamada, Gifu; Takashi Sugiyama, Gifu; Yoshihito Higashitutumi, Gifu, all of Japan

[73] Assignee: Sanyo Electric Co., Ltd., Osaka, Japan

[21] Appl. No.: 598,758

[22] Filed: Oct. 9, 1990

Related U.S. Application Data

[63] Continuation of Ser. No. 315,080, Feb. 24, 1989, abandoned.

[30] Foreign Application Priority Data

| Feb. 29, 1988 | [JP] | Japan | 63-46492 |
| Mar. 9, 1988 | [JP] | Japan | 63-55277 |
| Mar. 18, 1988 | [JP] | Japan | 63-36540[U] |
| Mar. 18, 1988 | [JP] | Japan | 63-36541[U] |
| Sep. 1, 1988 | [JP] | Japan | 63-115535[U] |

[51] Int. Cl.[5] ............... H04M 11/00; H04N 7/14
[52] U.S. Cl. .................................. 379/53; 358/85
[58] Field of Search ........................ 379/53; 358/85

[56] References Cited

U.S. PATENT DOCUMENTS

| 3,816,654 | 6/1974 | Brightman | 358/85 X |
| 4,485,400 | 11/1984 | Lemelson et al. | 358/85 |
| 4,715,059 | 12/1987 | Cooper-Hart et al. | 379/53 |
| 4,821,307 | 4/1989 | Flint, III | 379/53 |
| 4,843,461 | 6/1989 | Tatsumi et al. | 379/53 X |

FOREIGN PATENT DOCUMENTS

| 309341 | 3/1989 | European Pat. Off. | 379/53 |
| 310477 | 4/1989 | European Pat. Off. | |
| 59-158182 | 9/1984 | Japan . | |
| 61-296872 | 12/1986 | Japan . | |
| 63-180283 | 7/1988 | Japan | 379/53 |
| 2173675 | 10/1986 | United Kingdom | 379/53 |

OTHER PUBLICATIONS

Horitake et al., "New Model Video Telephone Set Design", *Review of the Electrical Communications Laboratories*, vol. 25, No. 1–2, pp. 61–70, Jan./Feb. 1977, published by Nippon Telegraph and Telephone Corp., Tokyo, Japan.

*Primary Examiner*—James L. Dwyer
*Assistant Examiner*—Wing F. Chan
*Attorney, Agent, or Firm*—Darby & Darby

[57] ABSTRACT

A visible telephone includes a housing in which a video camera is accommodated in a manner that an aperture thereof is directed to the front. The camera is fixed to a rotatable holder which is rotated by an operation of a knob outside the housing, responsively, an angle of declination or elevation of the aperture of the camera is changed. The camera includes a lens system and a solid-state image sensor which converts a light image from the lens system into an electrical signal (video signal), which is mounted on a circuit board. The solid-state image sensor is responsive to at least an infrared light. On the same or the other circuit board, an infrared LED is mounted. The infrared LED is lightened at necessary timing to expose a person or subject in the front of the aperture of the camera.

24 Claims, 13 Drawing Sheets

F I G.11
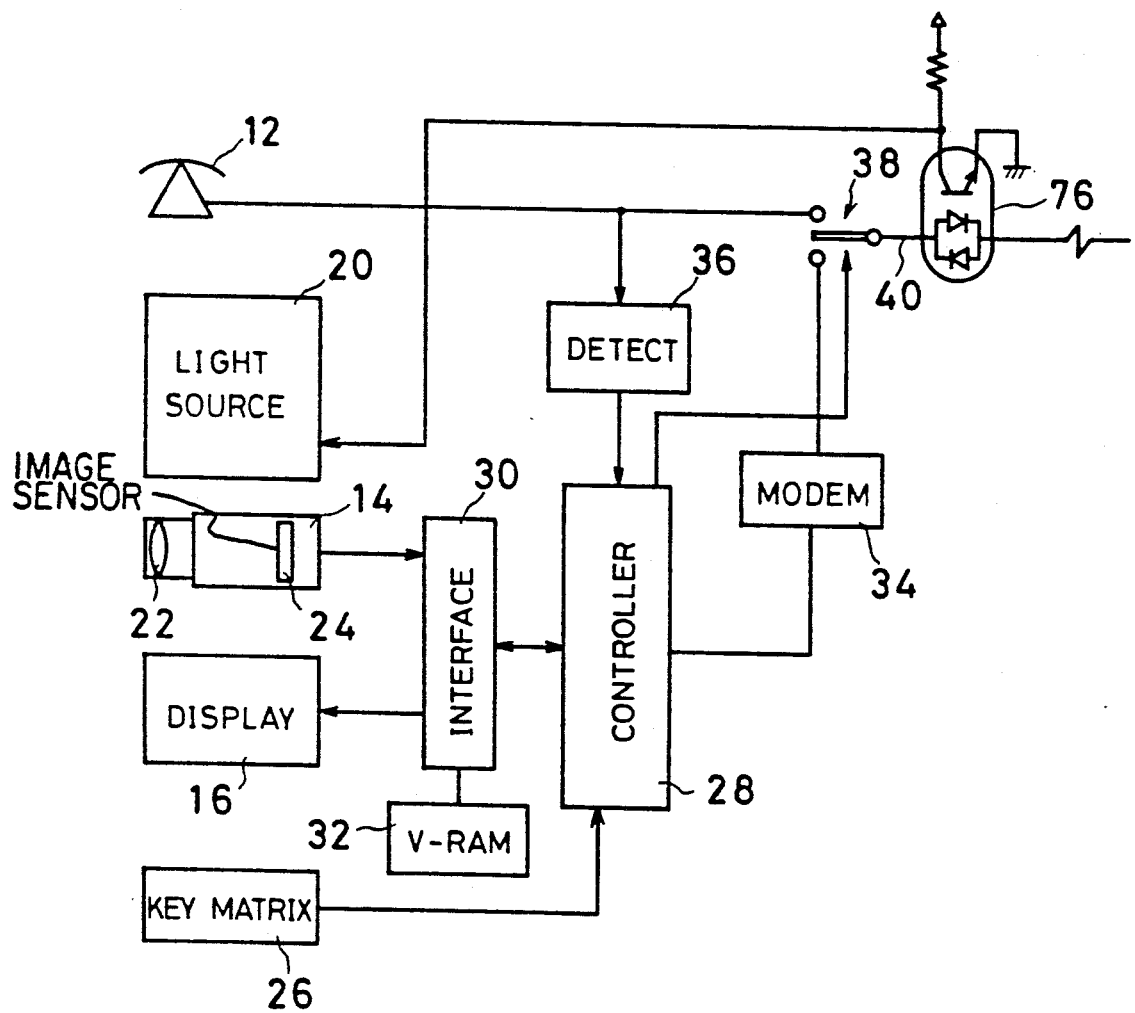

VISIBLE TELEPHONE

This is a continuation application Ser. No. 315,080, filed Feb. 24, 1989 now abandoned.

BACKGROUND OF THE INVENTION

1. Field of the invention

The present invention relates to a video telephone. More specifically, the present invention relates to a video telephone includes a video camera and an auxiliary light source which exposes a person or subject in the front of the video camera.

2. Description of the prior art

In, for example, Japanese Patent Application Laid-open No. 158182/1984 laid open on Sept. 7, 1984, a video or visible telephone having a video camera (hereinafter, simply called as "camera", often) which takes a picture of a person at this end and a monitor which displays an image of a person at the other end being transmitted from a video or visible telephone at the other end of the line is disclosed.

On the other hand, an interphone having an infrared light emitting means which is fixedly provided in a housing together with a camera is disclosed in, for example, Japanese Patent Application Laid-open No. 296872/1986 laid open on Dec. 27, 1986.

In any prior arts, since a position or attitude of an aperture of the camera is fixed and constant, the aperture does not always be coincident with a face of the person. Therefore, if tried to wholly or completely take a picture of the face of the person, sometimes, the person is compelled to an unnatural attitude.

In addition, there is a video camera for watching a person or subject, which has a swinging or oscillating mechanism capable of changing a position or attitude of the aperture so as to be coincident with the subject. However, a large space and a complex mechanism are required in the swinging or oscillating mechanism, and therefore, such a mechanism is not suitable for a compact video or visible telephone.

SUMMARY OF THE INVENTION

Therefore, a principal object of the present invention is to provide a novel video telephone.

Another object of the present invention is to provide a video telephone in which a position or attitude of an aperture of a camera can be changed.

Another object of the present invention is to provide a video telephone using an infrared light emitting element as an auxiliary light source.

Another object of the present invention is to provide a video telephone in which consumption of an electric power necessary for an auxiliary light source can be minimized.

The other object of the present invention is to provide a video telephone in which a light from an auxiliary light source can always expose the front of an aperture even if a position or attitude of the aperture of camera is changed A video telephone in accordance with the present invention comprises a video camera, transmitting means which transmits an image taken by the video camera on a transmitting line, receiving means which receives an image of the other end of the line through the transmitting line, and a display which displays a still picture or a moving picture based upon an image received by the receiving means or an image taken by the video camera, characterized in that the video camera is mounted on a unit of a video telephone such that a position or attitude of an aperture of the video camera can be changed.

In accordance with the present invention, since a position or attitude of the aperture of the camera can be changed to be exactly directed to a person or subject in the front of the camera, the person cannot be compelled to an unnatural attitude.

Such a position or attitude changing mechanism includes a knob outside a telephone housing and a rotatable holder connected to the knob, and the camera is fixed to the holder. Therefore, by operating the knob, the position or attitude of the aperture of the camera can be changed. In accordance with the embodiment, since the position or attitude of the aperture of the camera can be changed by a simpler mechanism, it becomes compact and simple in comparison with the swinging or oscillating mechanism of a conventional video camera for watching a person or a subject, and therefore, it is avoidable to make a video telephone larger.

In a certain aspect of the present invention, on the holder connected to the knob, an infrared light emitting element, for example, an infrared LED is fixed together with the camera. Therefore, in response to operation of the knob, the position or attitude of the aperture of the camera is changed and an irradiating direction of an infrared light from the infrared light emitting element follows thereto, and therefore, the light of the infrared light emitting element always exposes a person in the front of the aperture of the camera.

However, in another embodiment, the infrared light emitting element is fixedly provided separately from the camera. In this case, the irradiating direction of the infrared light from the infrared light emitting element is adjusted such that the infrared light can expose the whole of a range in the vicinity of a focal point of the lens system of the camera even when the position or attitude of the aperture of the camera is changed. In this embodiment, it is not necessary to change or move the infrared light emitting element together with the camera, and therefore, the space for changing the position or attitude of the aperture of the camera can be minimized, and thus it is possible to further miniaturize the video telephone.

In another embodiment in accordance with the present invention, the infrared light emitting element is driven only a time when necessary. Specifically, the infrared light emitting element is driven only time when an image of a person is to be taken by the camera. Therefore, when a camera switch is operated or when a telephone network line is established between the video telephone at this end and the visible telephone at the other end, the infrared light emitting element is driven. In accordance with the embodiment, since the infrared light emitting element is driven only for a necessary time period, the consumption of the electric power therefor can be minimized.

As the infrared light emitting element, an infrared LED, a combination of an incandescent electric lamp and an infrared light transmissive filter, etc. can be utilized.

In the other embodiment in accordance with the present invention, the infrared light emitting element is responsive to luminance adjusting means, for example, a variable resistor. Specifically, when the luminance adjusting means is operated to increase the luminance or brightness, the infrared light emitting element is driven to be lightened at a specific position of the variable resistor and, when the luminance adjusting means is operated to decrease the luminance, the infrared light emitting element is cut-off at a specific position of the variable resistor. In accordance with the embodiment, it is not necessary to separately provide the luminance adjusting means and an on/off switch of the infrared light emitting element, only by the operation of the luminance adjusting means, control of the light amount exposing the person or subject and adjustment the luminance of the video signal can be simultaneously implemented, and therefore, it is possible to drastically improve operatability.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 11 is a block diagram showing a modified example of FIG. 7 embodiment.

DETAIL DESCRIPTION OF THE PREFERRED EMBODIMENTS

Figure 1:
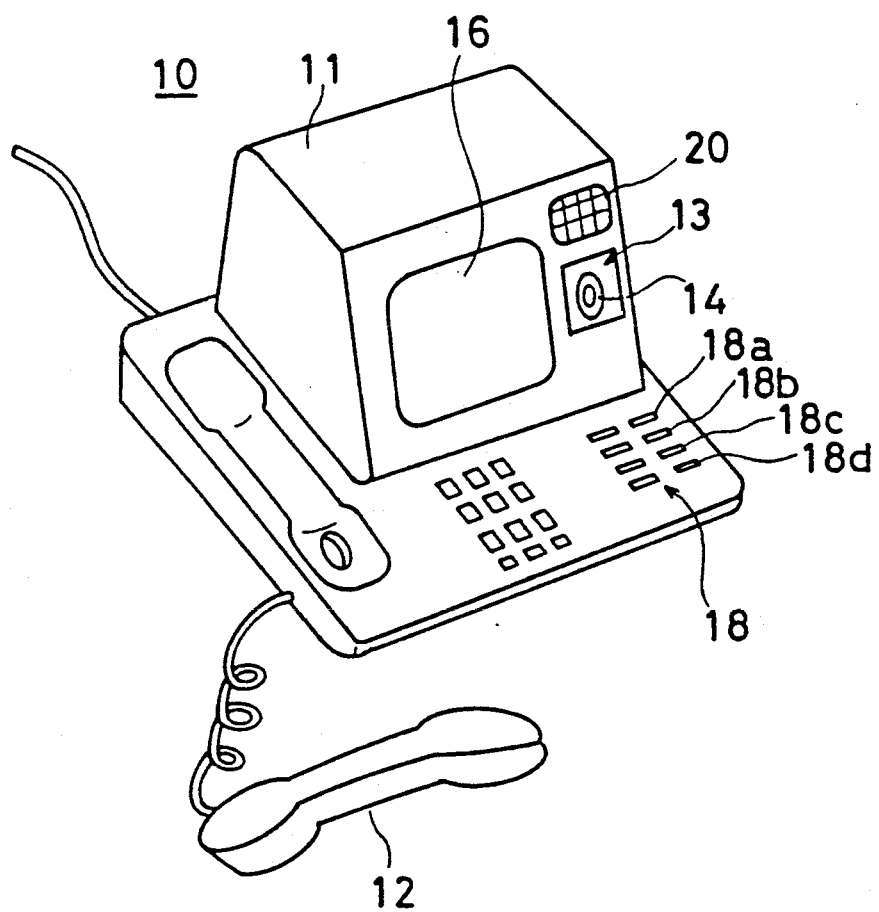
FIG. 1 shows a perspective view showing one embodiment in accordance with the present invention.

With reference to FIG. 1, a video telephone 10 of one embodiment in accordance with the present invention includes a housing having a base portion and a trapezoid portion formed thereon, and an audio telephone 12 is connected to the base portion of the housing 11.

On a front face of the trapezoid portion of the housing 11, a window 13 is formed, and a video camera 14 is arranged at the window 13. On the front face of the trapezoid portion, a display 16 which includes a CRT or a liquid crystal panel and functions as a video monitor is provided at the side of the window.

A group of switches 18 is provided on the base portion of the housing 11, which includes a power switch 18a, a transmission switch 18b, a camera switch 18c and a picture request switch 18d. The transmission switch 18b is operated at a time when a video signal of an image of a person taken by the camera 14 is to be transmitted to a video telephone (not shown) at the end of the line. The camera switch 18c is operated at a time when the image of the person is to be taken by the camera 14. The picture request switch 18d is operated at a time when transmission of a video signal of an image is requested to the video telephone at the other end of the line such that the image of the person at the other end of the line can be displayed on the display 16.

Figure 2A:
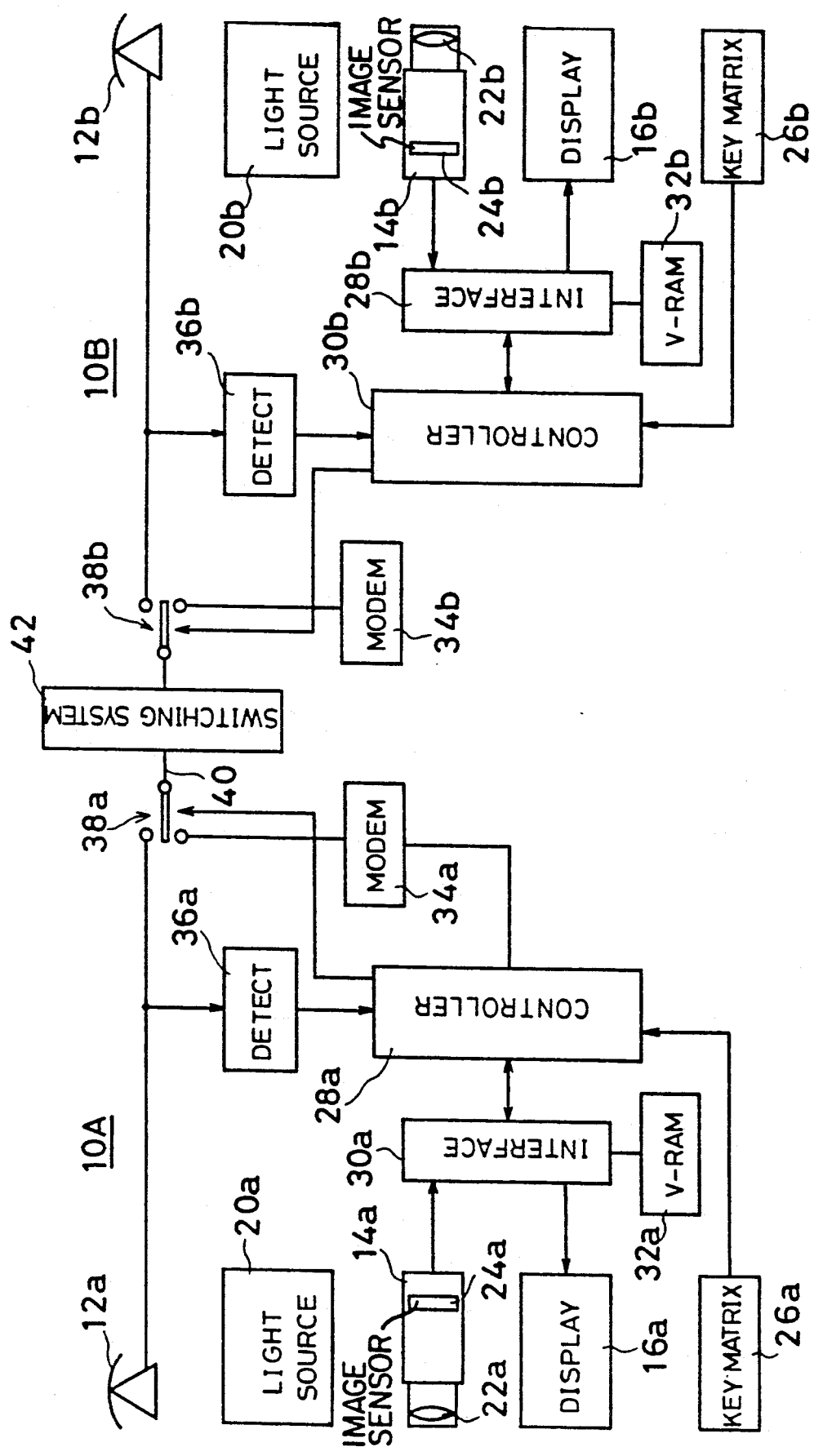
FIG. 2A is a block diagram showing one example of a video telephone system using FIG. 1 embodiment.

By using the video telephone 10 as shown in FIG. 1, a video telephone system as shown in FIG. 2A is constructed, wherein the video telephone 10A at this end of the line and the video telephone 10B at the other end of the line are communicated with each other through switching system 42.

Now, with reference to FIG. 2A, construction of the video telephone 10 will be described. In addition, in the following, only the video telephone 10A at this end of the line to which annex character "A" or "a" is added is described and, as to the video telephone 10B at the other end of the line, only annex character "B" or "b" is indicated in FIG. 2A so as to omit a duplicate description thereof.

A controller 28a included in the video telephone 10A composed of a microcomputer which controls a whole operation of the video telephone 10A in accordance with a predetermined program. The controller 28a receives a key input signal from a key matrix 26a for the group of key 18, that is, the keys 18a–18d. The controller 28a is connected to the above mentioned camera 14a and display 16a via an interface 30a.

The camera 14a includes a lens system 22a which is focused to a person or subject exhibiting in the front of the aperture of the camera 14a at a predetermined distance, and a solid-state image sensor 24a which converts a light image from the lens system 22a into a video signal and is composed of CCD, for example. In this embodiment, the solid-state image sensor 24a is a CCD image sensor of a frame transfer system.

In this embodiment, since an auxiliary light source 20a is provided, an F value of the lens system 22a may be set "2.0 or more". Because a clear lens system having an F value of "2.0 or less" is high in cost and therefore the cost of the video telephone is increased. Then, in this embodiment, the person or subject is exposed by the light source 20a, and therefore, even if the lens system 22a having the F value of "2.0 or more" is used, it is possible to obtain sufficient exposure light amount.

In addition, in the case where an infrared light emitting element described later is utilized as the light source 20a, as the solid-state image sensor 24a, CCD having sensitivity in a visible region and an infrared region is utilized.

The interface 30a includes a signal processing circuit which converts the video signal obtained from the solid-state image sensor 24a of the camera 14a into the digital coded video signal, or converts the digital coded video signal given from the video telephone 10A at the other end of the line into a video signal suitable for the display 16a. A digital coded video signal of an image of a person at this end taken by the camera or a digital coded video signal of a still picture of an image of a person at the other end is stored in a V-RAM 32a as video data.

A modem 34a and a detecting circuit 36a are connected to the controller 28a. The modem 34a transmits the digital coded video signal (video data) of a still picture of an image of a person at this end of the line which is stored in the V-RAM 32a to the video telephone 10B at the other end or receives the digital coded video signal (video data) of a still picture of an image of a person at the other end of the line from the video telephone 10B at the other end. The detecting circuit 36a senses or detects a transmission starting code of the video signal which is transmitted from the video telephone 10A or 10B and gives a detecting signal to the controller 28a. Such a transmission starting code is a type of DTMF (Dual Tone Multi-Frequency) signal.

Figure 2B:
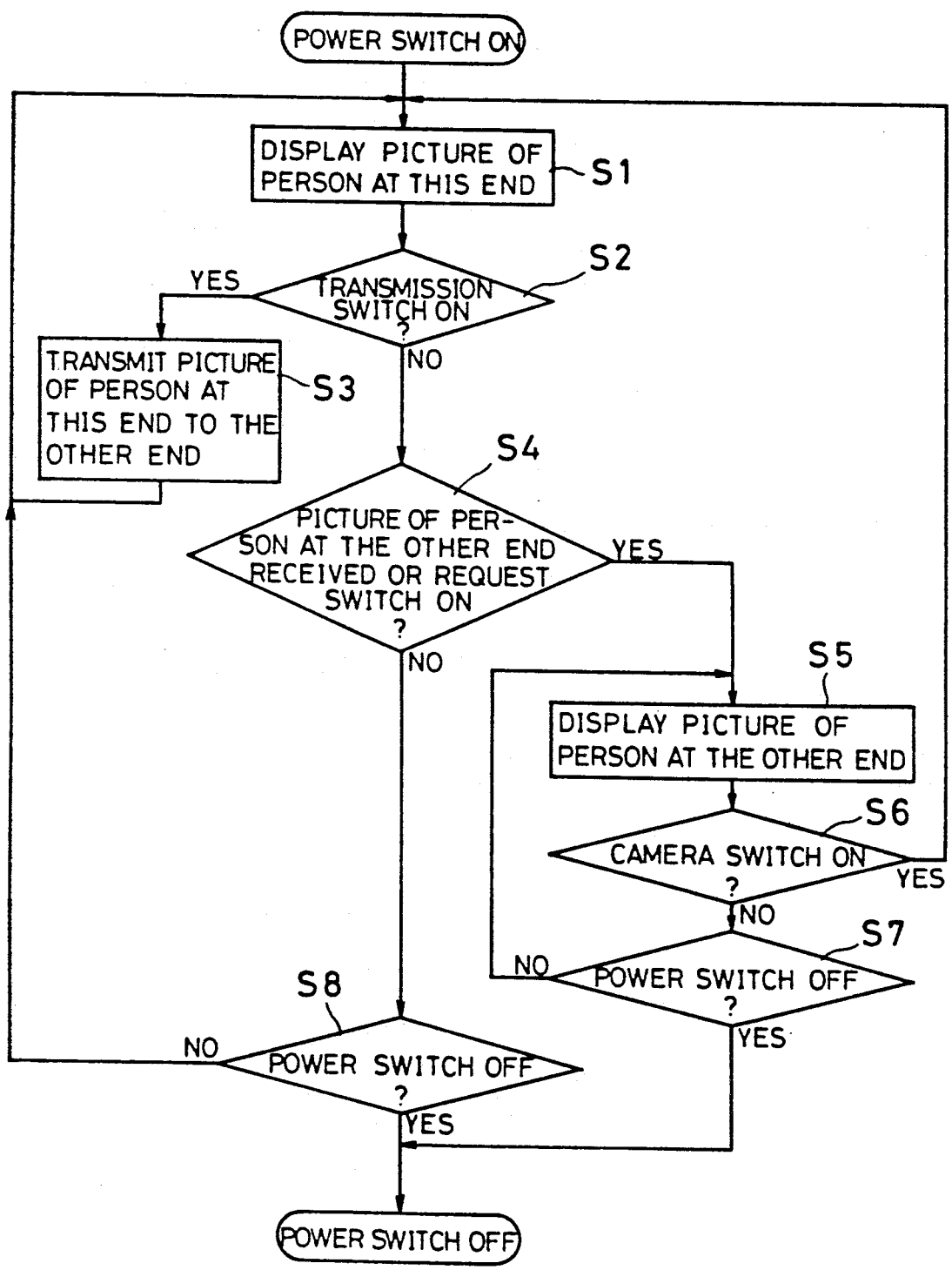
FIG. 2B is a flowchart showing an operation of FIG. 2A embodiment.

With reference to FIG. 2B, when the power switch 18a (FIG. 1) of the video telephone 10A at this end shown in FIG. 2A is turned on, in the step S1, an image of a person of the video telephone 10A at this end of the line which is taken by the camera 14a is displayed by the display 16a as a moving picture.

In addition, before or after turning-on the power switch 18a, the telephone network line 40 is to be established between the both video telephones 10A and 10B (FIG. 2A) by using the audio telephones 12A and 12B. Then, in the state where the telephone network line is established between the audio telephones 12a and 12b via the switching system 42, the transmission switch 18b included in the group of keys 18 is operated. Responsively, DTMF signal is outputted from the audio telephone 12a, and the same is detected by the detecting circuit 36a, whereby the controller connects the network relay 38a to the side of the modem 34a. This means that in the step S2, the controller 28 detects whether or not the transmission switch 18b (FIG. 1) is turned on. If the transmission switch 18b is turned on, in the succeeding step S3, the controller 28 switches the network relay 38a to the side of the modem 34a. At this time, the video data of the still picture of the image of the person at this end of the line being displayed on the display 16a is saved in the V-RAM 32a, and the video data is read from the V-RAM 32A by the controller 28. Therefore, the digital coded video signal (video data) of the still picture of the image of the person at this end is sent onto the telephone network line 40.

If it is detected that the transmission switch 18b is not turned on in the step S2, in the next step S4, the controller 28a detects whether the digital coded video signal (video data) of the still picture of the image of the person at the other end of the line, or the picture request switch 18d (FIG. 1) for requesting to send the image of the person at the other end of the line is turned on.

When "YES" is determined in the step S4, the network relay 38a is switched to the side of the modem 34a by the controller 28a in response to the detection by the detecting circuit 36a or the operation of the picture request switch 18d. Responsively, the video data of the still picture of the image of the person at the other end of the line via the telephone network line 40 is saved in the V-RAM 32a through the network relay 38a, the modem 34a, the controller 28a and the interface 30a. Then, in the step S5, under the control of the controller 28a, the video data of the still picture of the person at the other end which has been saved in the V-RAM 32a is read and applied to the display 16a. Therefore, the picture of the person at the other end of the line is displayed as a still picture on the display 16a instead of the moving picture of the image of the person at this end of the line which has been displayed.

Thereafter, in the step S6, the controller 28a determines whether or not the camera switch 18d (FIG. 1) is turned on. If the camera switch 18d is turned on, the process returns the previous step S1.

When "NO" is determined in the step S6, in the succeeding step S7, the controller 28 determines whether or not the power switch 18a is turned off. If the power switch 18a is not turned off, the process returns the step S5.

Similarly, "No" is determined in the step S4, the controller 28a determines whether or not the power switch 18a is turned off, in the step S8. In this case, if the power switch 18a is not turned off, the process returned to the previous step S1.

When the turning-off of the power switch 18a is detected in the step S7 or S8, the electric power of the video telephone 10 at this end is wholly turned off by the controller 28a.

Operation or action of such a video telephone system was well known, and therefore, more detail description thereof is omitted here.

Figure 3:
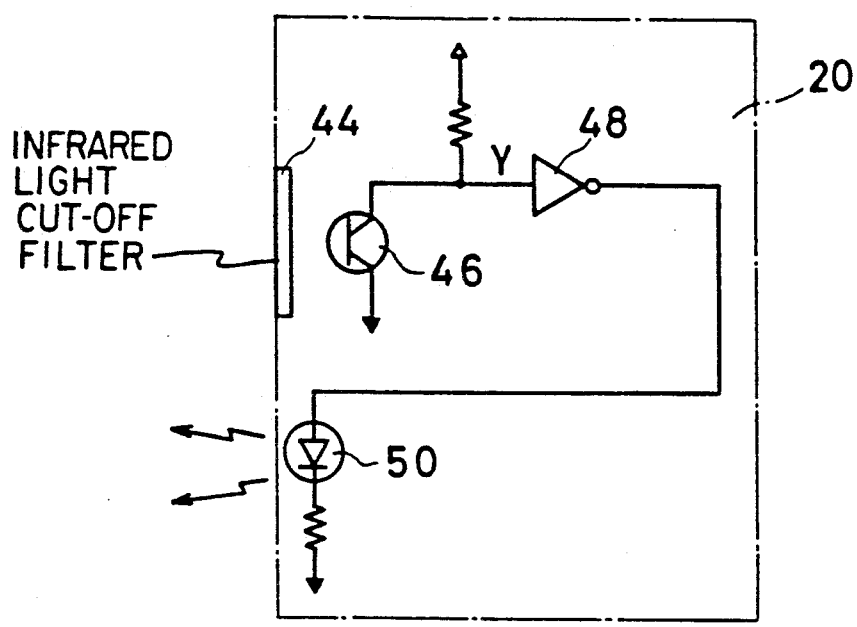
FIG. 3 is a circuit diagram showing one example of a light source in FIG. 1 embodiment.

With reference to FIG. 3, the light source 20 as shown in FIG. 1 and FIG. 2A includes a photo transistor 46 covered by an infrared light cut-off filter 44. An output of the photo-transistor 46 is given to an infrared LED 50 via an inverter 48. Therefore, when the light amount of the external light which enters to the photo-transistor 46 through the infrared light cutoff filter 44 becomes less than a predetermined value, the photo-transistor 46 is turned on to output an underexposure signal Y. In response thereto, the infrared LED 50 is driven by the inverter 48 to be lighted. The infrared light emitted by the infrared LED 50 is irradiated to the front of the light source 20 shown by FIG. 1.

In addition, since the infrared light emitted by the infrared LED 50 is cut-off by the infrared light cut-off filter 44, a so-called oscillation phenomenon wherein the photo-transistor 46 is turned on by the infrared light from the infrared LED 50 can be effectively prevented.

In addition, although only one infrared LED 50 is illustrated in FIG. 3 circuit, the number of the infrared LEDs 50 can be suitably determined by taking into consideration the light amount necessary for the auxiliary light source.

Figure 9:
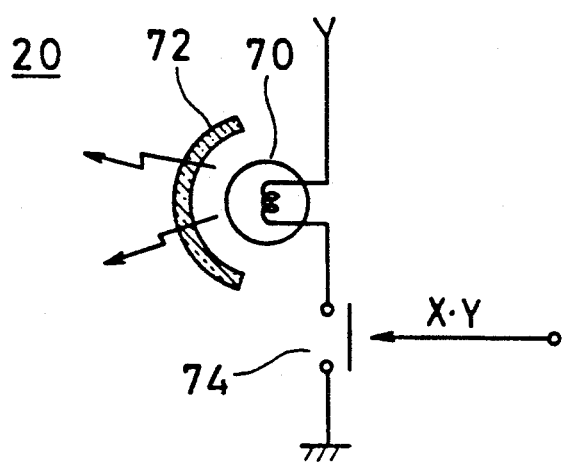
FIG. 9 is a circuit diagram showing another example of a light source.

Furthermore, instead of the infrared LED 50, it is possible to use a combination of an incandescent electric lamp and an infrared light transmissive filter which transmits only the infrared light as shown in FIG. 9, described later.

Figure 4:
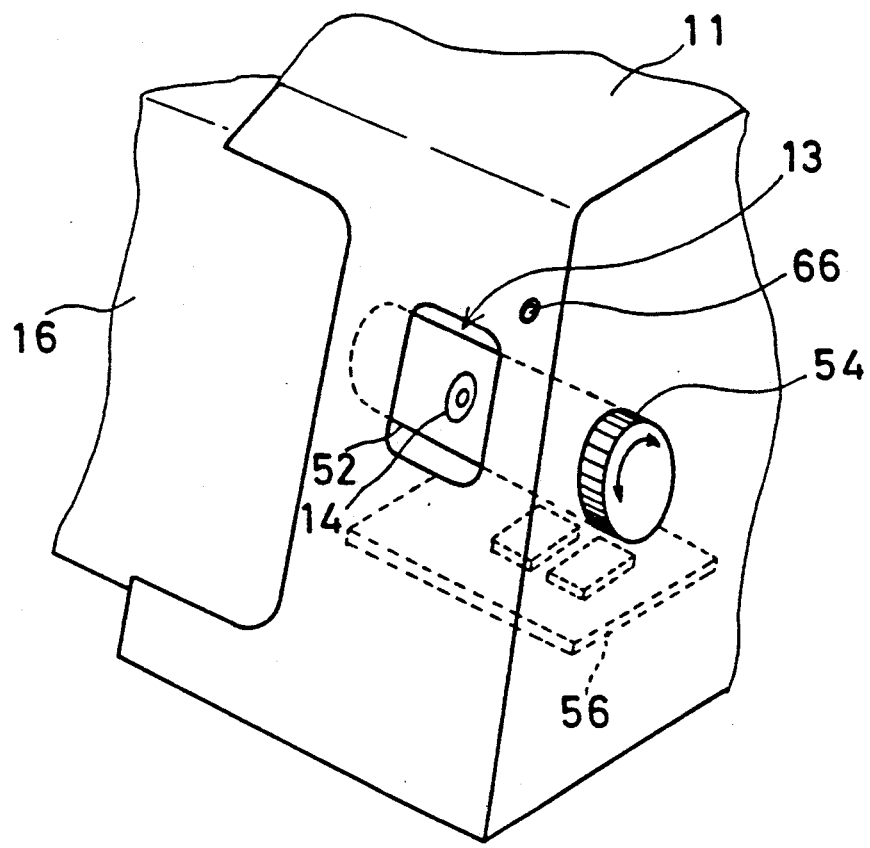
FIG. 4 is a partial perspective view showing one example of a mechanism for changing a position or attitude of an aperture of a camera.

With reference to FIG. 4, the camera 14 an aperture of which is arranged within the window 13 formed on the front face of the housing 11 is fixed to a rotatable holder 52. The rotatable holder 52 is supported rotatably, and separated from a circuit board 56 within the housing 11, and connected to a knob 54 outside the housing 11. When the knob 54 is rotated in the direction shown by an arrow in FIG. 4, responsively, the rotatable holder 52 is changed in an attitude, and therefore, a direction of the aperture of the camera 14 which is fixed to the rotatable holder 52 can be also changed.

Furthermore, as seen from FIG. 4, in the vicinity of the window 13 of the housing 11, an LED 66 is provided, which is lighted at a time when the infrared LED 50 is driven so as to indicate that the light source 20 is enabled.

Figure 5:
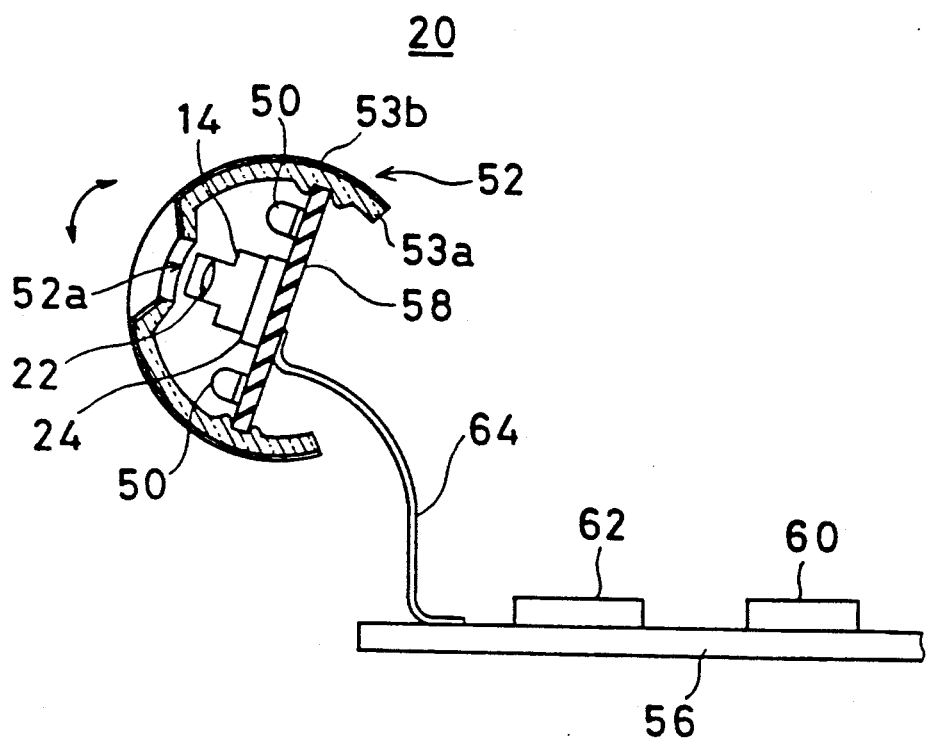
FIG. 5 is an illustrative view showing a relationship between a camera and a circuit board.
Figure 6:
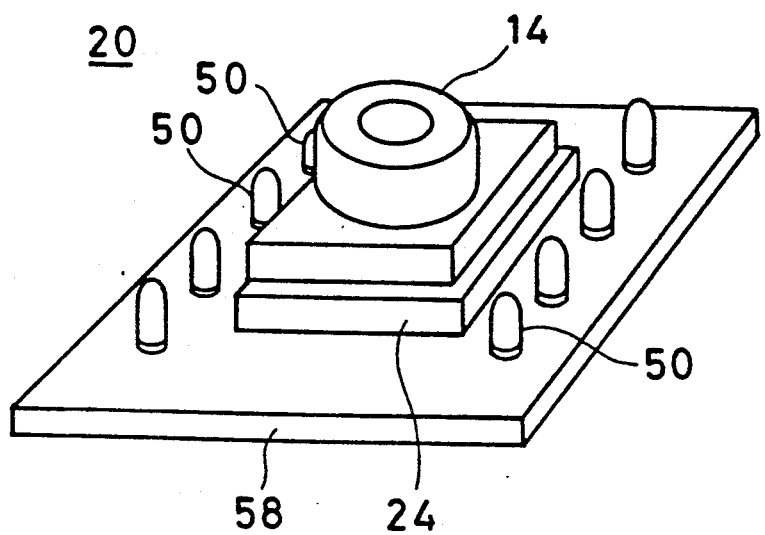
FIG. 6 is a perspective view showing a camera and an infrared LED mounted on a circuit board.

More specifically, with reference to FIG. 5, the rotatable holder 52 includes a unit 53a made of a half-cylindrical transparent resin-molded, which is opened at the rear side thereof, and a visible light cut-off film 53b laminated or adhered on the surface thereof. An opening 52a is formed on the side face in the front of the rotatable holder 52, i.e. the resin-molded unit 53a, and the lens system 22 of the camera 14 is arranged at the opening 52a. Then, an optical system circuit board 58 as seen from FIG. 6 is fixed to the rear side of the rotatable holder 52. The camera 14 and a plurality of (8 in this embodiment shown) infrared LEDs 50, 50, . . . are mounted on the optical system circuit board 58. The lens system 22 of the camera 14 is faced to the above described opening 52a, the solid-state image sensor 24 for converting the light image from the lens system 22 into the video signal is mounted on the circuit board 58. Thus, the infrared LEDs 50 and the circuit board 58 are covered by the visible light cut-off film 53b of the rotatable holder 52, and therefore the same cannot be seen from the external.

Then, a driving LSI 60 which constitutes a driving circuit for supplying driving clocks to the solid-state image sensor 24 of the camera 14, and the processing LSI 62 are mounted on another circuit board 56 within the housing 11. The processing LSI 62 includes a sample hold circuit for sampling and holding the video signal obtained from the solid-state image sensor 24, a synchronous signal addition circuit for adding a synchronous signal to a blanking period of the video signal, a gamma correction circuit, etc. A signal is sent and received between the both circuit boards 56 and 58 by a flexible lead 64.

Since the circuit board 58, that is, the rotatable holder 52 is thus separated from the circuit board 56, such a circuit board for mounting the optical system, i.e. the camera 14, the infrared LEDs 50, and so on can be made small. Therefore, the circuit board 58, that is, the rotatable holder 52 and thus the camera 14 and the infrared LEDs 50 can be rotated by a simple rotations mechanism.

More specifically, when the knob 54 is rotated, the rotatable holder 52 and thus the opening 52a is rotated in a direction shown by an arrow in FIG. 5. Therefore, the aperture of the camera which is fixed to the rotatable holder 52 can be declined or elevated Therefore, by operating the knob 54, the aperture of the camera 14 can be always directed to the person or subject precisely.

In addition, since the infrared LED 50 as the auxiliary light source is mounted on the circuit board 58 to which the rotatable holder 52 is fixed, when the knob is rotated, the attitude of the infrared LED 50, that is, the irradiating direction of the infrared light from the infrared LED 50 is also changed in accordance with the change of the position or attitude of the aperture of the camera 14. Therefore, even if the position or attitude of the aperture of the camera 14 is changed, the exposure light of a suitable light amount is always irradiated to the person or subject in the front of the aperture of the camera 14.

In the embodiment as shown in FIG. 6, eight (8) infrared LEDs 50, 50, . . . are mounted on the circuit board 58. If each of such infrared LEDs 50 is one having an output power approximately 6 mW and a wide directivity, the person or subject in the front of the camera 14 at the distance of 50 cm can be exposed luminous intensity more than 50 luxes that is enough bright to obtain a clear video signal by the solidstate image sensor 24.

Figure 7:
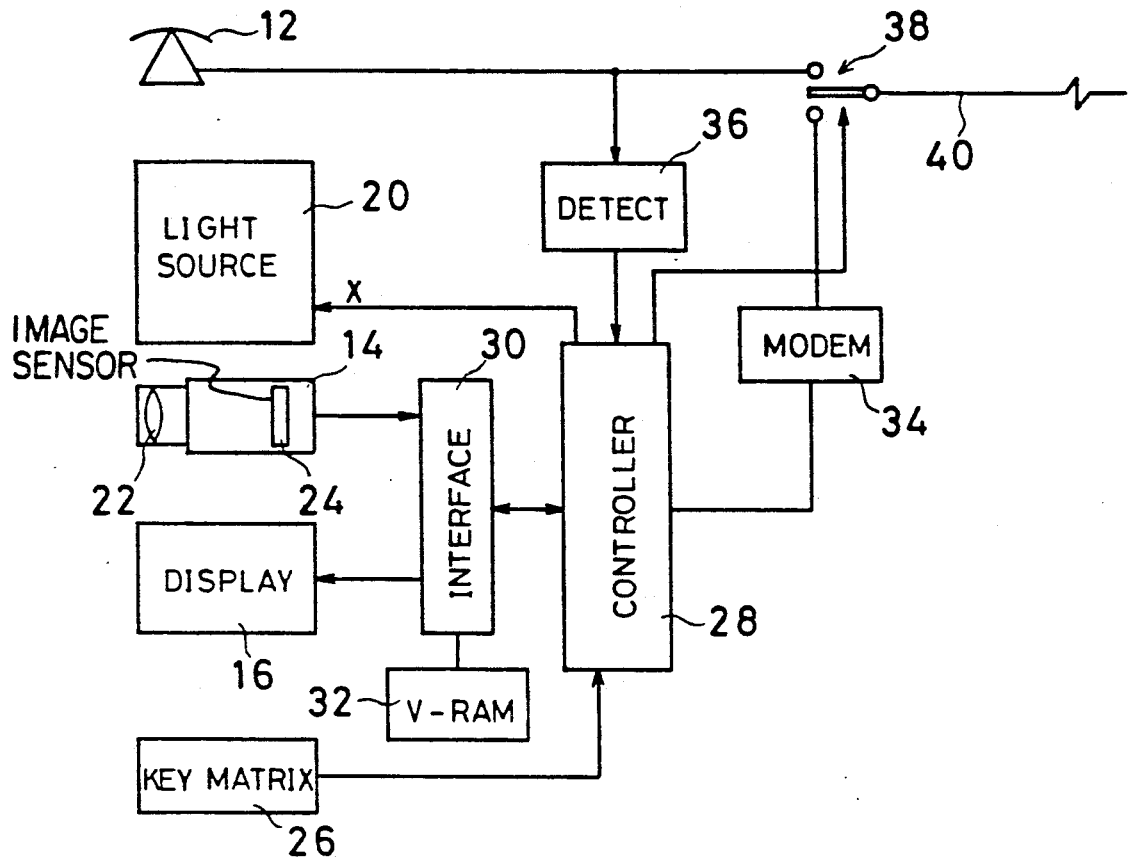
FIG. 7 is a block diagram showing another embodiment in accordance with the present invention.

In addition, in this embodiment, as shown in FIG. 7, the light source 20 is lighted in response to a lighting request signal X from the controller 28.

Figure 8:
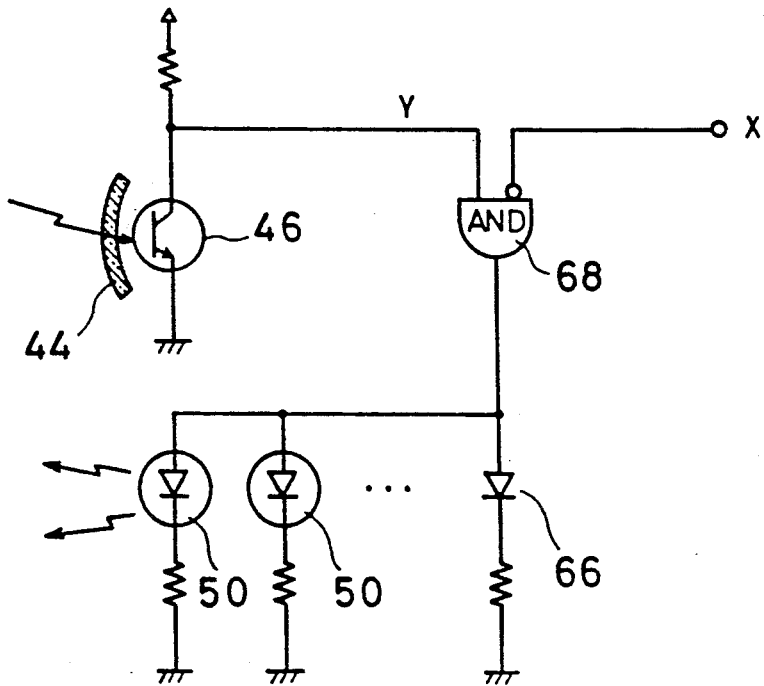
FIG. 8 is a circuit diagram showing one example of a light source of FIG. 7 embodiment.

More specifically, as shown in FIG. 8, an output of the photo-transistor 46 covered by the infrared light cut-off filter 44, that is, the underexposure signal Y is given to one input of an AND gate 68. The lighting request signal X from the controller 28 is inverted and given to the other input of the AND gate 68. An output of the AND gate 68 is commonly connected to anodes of the infrared LEDs 50, 50, . . . and the above described LED 66 cathodes of which are connected to the ground. Therefore, only when the lighting request signal X from the controller 28 is outputted and the underexposure signal Y from the phototransistor 46 is outputted, the infrared LEDs 50 and the LED 66 are lighted.

This means that when the step S1 of FIG. 2B is started, if the above described lighting request signal X from the controller 28 is outputted, and if the underexposure signal Y is outputted, at this time, the infrared LED 50 is driven to be lighted.

Then, when the step S5 of FIG. 2B is started, the controller 28 stops to output the lighting request signal X. Therefore, at this time, the infrared LED 50 of the light source 20 is cut-off because it is not necessary to take a picture of the person at this end any more in this step S5.

Instead of the infrared LED 50 as shown in FIG. 3, or FIG. 5, FIG. 6 and FIG. 8, an incandescent electric lamp 70 as shown in FIG. 9 can be used. In this case, an infrared light transmissive filter 72 is provided in the front of the incandescent electric lamp 70. Then, the incandescent electric lamp 70 is connected to a switch 74 which is turned on by the lighting request signal X and the underexposure signal Y. Therefore, when the signal Y from the photo-transistor 46 as shown in FIG. 8 and the signal X from the controller 28 are both outputted, the incandescent electric lamp 70 is lighted and thus the infrared light is irradiated from the light source 20.

Figure 10:
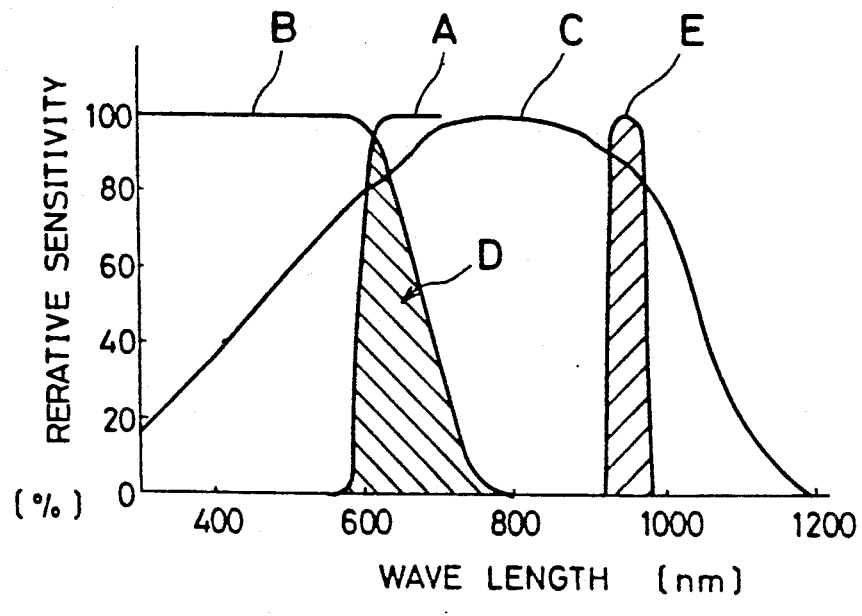
FIG. 10 is a graph showing a relationship between spectrum of light source shown in FIG. 9 and sensitivity of a camera.

In the case of the embodiment, an incandescent light from the incandescent electric lamp 70 is passed through the infrared light transmissive filter 72 having a light transmission characteristic shown by a line A in FIG. 10 to expose the person or subject in the front of the camera 14. A reflected light from the person or subject is entered into the solid-state image sensor 24 through a infrared light cut-off filter (not shown). The infrared light cut-off filter has a light transmission characteristic shown by a line B in FIG. 10 and the solid-state image sensor 24 has a sensitivity characteristic shown by a line C. Therefore, in FIG. 9 embodiment, a wave length of the light image converted into the video signal by the solid-state image sensor 24 becomes a range D shown by oblique lines in FIG. 10, that is, 600–800 nm which is shorter than the wave length (940 nm) shown by a line E in FIG. 10 of GaAs infrared LED which has been presently put into practice. On the other hand, in a video camera using a solid-state image sensor such as a CCD, in order to reduce smear, it is preferable that the wave length of the light being entered into the solid-state image sensor is short. Therefore, instead of the infrared LED 50 utilized in the previous embodiments, adoptation of the light source 20 composed of a combination of the incandescent electric lamp 70 and the infrared light transmissive filter 72 brings a specific advantage.

FIG. 11 shows a modified example of FIG. 7 embodiment. The signal X is outputted from the controller 28 in FIG. 7 embodiment, in contrast, the signal X to the light source 20 is outputted from a photo-coupler 76 in this embodiment. More specifically, in FIG. 11 embodiment, an output signal of the photo-coupler 76 which senses a circuit current of the telephone network line 40 is used as the lighting request signal X. To this end, the photocoupler 76 is inserted in the telephone network line 40. The photo-coupler 76 composed of a combination of an LED which emits the light by the circuit current from the audio telephone 12 and a photo-transistor which is photo-coupled to the LED, and an output of the photo-transistor becomes the lighting request signal X. Since the circuit current flows only during a time period when the telephone network line 40 is established between the both of the audio telephones 12a and 12b (FIG. 2A), in this embodiment, the lighting request signal X is outputted from the photo-coupler 76 only during this time period.

As shown in FIG. 7 or FIG. 11 embodiment, if the light source 20 is lighted only when the lighting request signal X and the underexposure signal Y are outputted, the light source 20 is not lighted unnecessarily, and therefore, it is possible to reduce the consumption of electric power in comparison with the embodiment shown in FIG. 2 and FIG. 3 in which the light source 20 is lighted whenever the light amount of the external light amount is insufficient.

Figure 12:
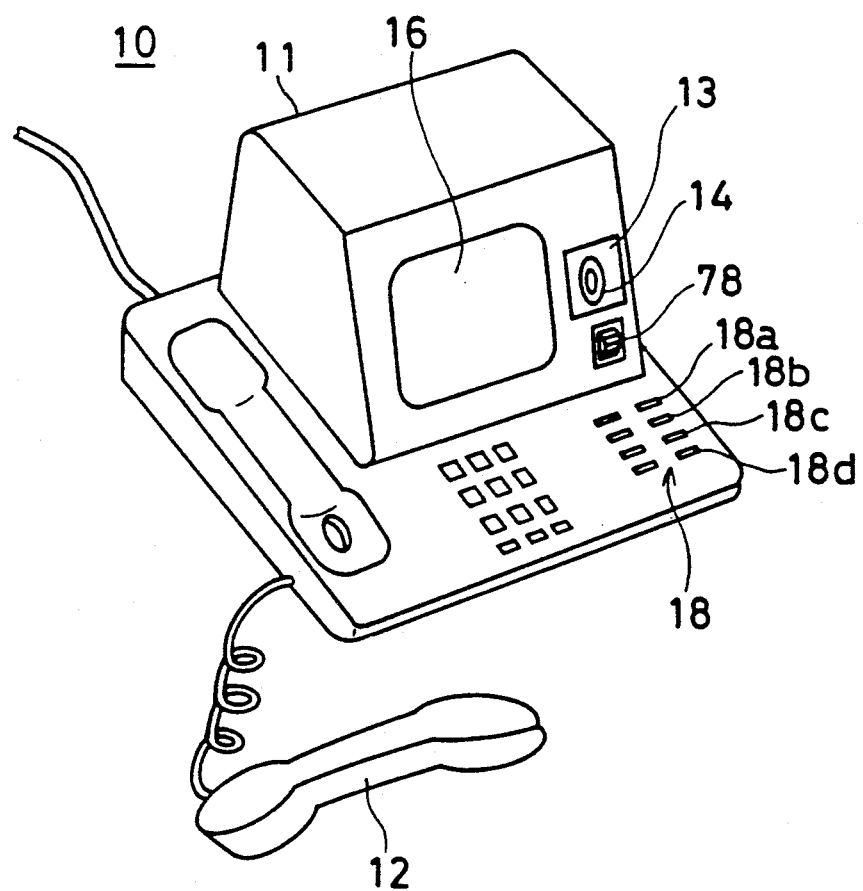
FIG. 12 is a perspective view showing a further embodiment in accordance with the present invention.
Figure 13:
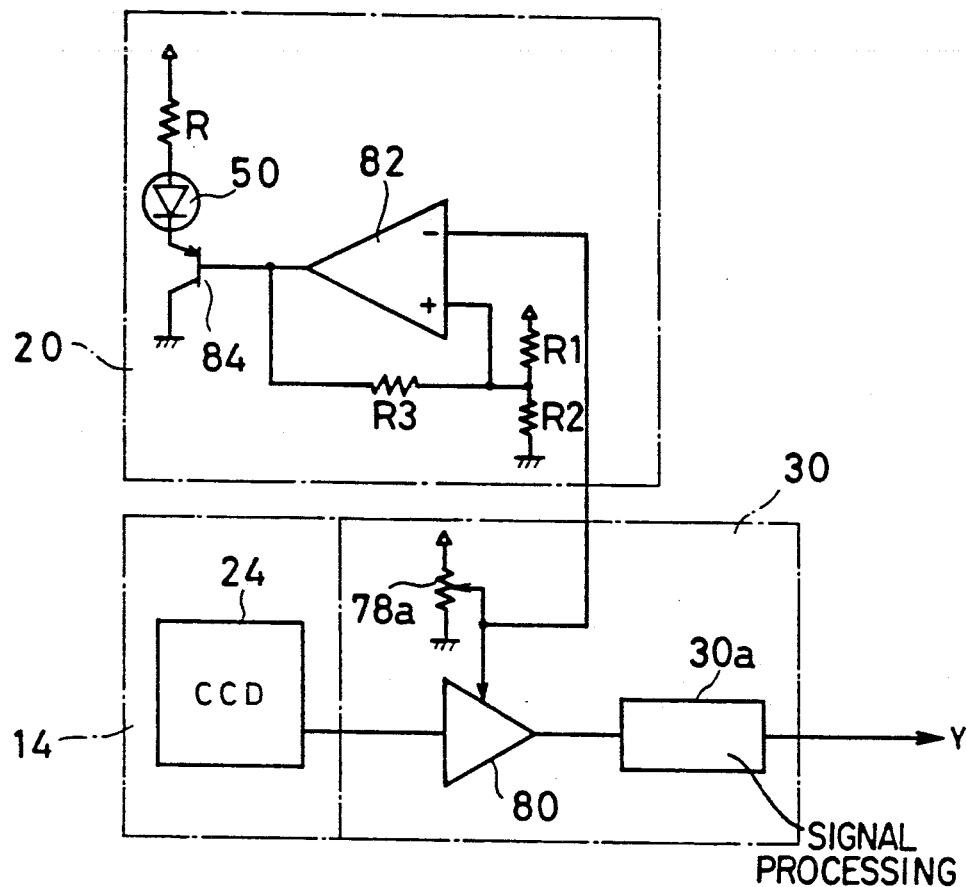
FIG. 13 is a circuit diagram showing a major portion of FIG. 12 embodiment.

FIG. 12 is a perspective view showing another embodiment in accordance with the present invention, wherein a luminance adjusting knob 78 is added with respect to FIG. 1 embodiment. The luminance adjusting knob 78 is connected to a variable resistor 78a as shown in FIG. 13, and the variable resistor 78a is connected to a variable gain amplifier 80 inserted between the solid-state image sensor 24 and the interface 30. When the knob 78 is operated, a resistance value of the variable resistor 78a is changed and thus the gain of the variable gain amplifier 80 is changed. Therefore, a level of the video signal from the solid-state image sensor 24, that is, the luminance is changed.

Then, the variable resistor 78a is connected to one input of an operational amplifier 82 included in the light source 20. A constant voltage divided by resistors R1 and R2 and a voltage fed-back from the output of the operational amplifier 82 via a resistor R3 are given to the other input of the operational amplifier 82 in a superposed manner. Therefore, the operational amplifier 82 level-discriminates the voltage determined by the variable resistor 78a in accordance with a hysteresis characteristic having a first and second threshold levels. An output of the operational amplifier 82 is given to a transistor 84 inserted in a current path of the infrared LED 50.

In addition, respective resistance values r1, r2 and r3 of the resistors R1, R2 and R3 are set such that the first and second threshold levels respectively coincident with the maximum value and the minimum value of the variable resistor 78a.

Figure 14:
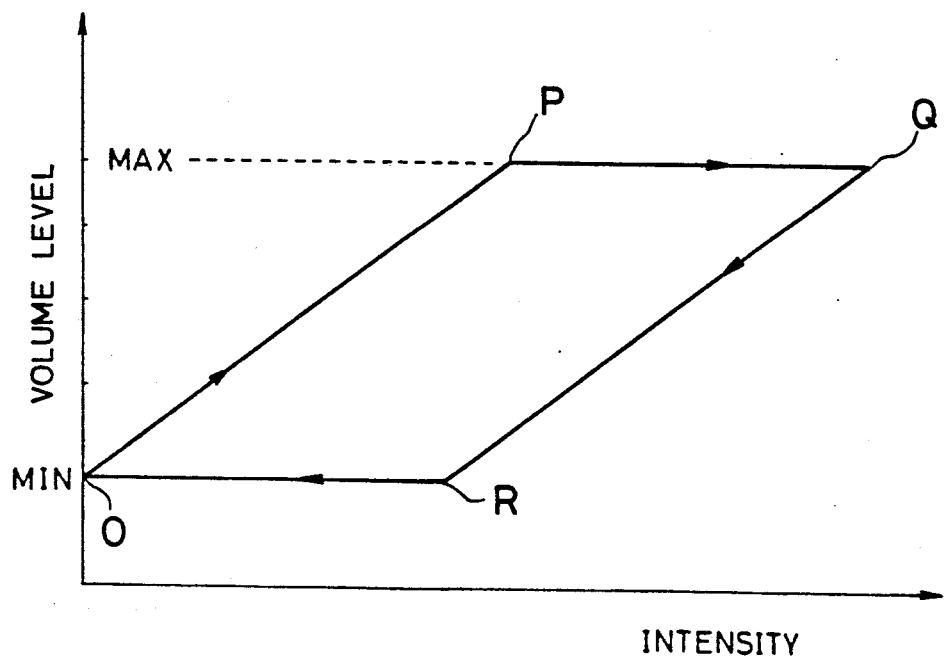
FIG. 14 is a graph showing a relationship between a level of a luminance adjusting volume and luminance in circuit shown in FIG. 13.

A point O shown in FIG. 14 is a state that the resistance value of the variable resistor 78a connected to the luminance adjusting knob 78 is at the minimum value, and in this state, the output from the operational amplifier 82 is the low level. Therefore, the infrared LED 50 is not lighted.

As the resistance value of the variable resistor 78a is made larger by rotating the luminance adjusting knob 78, the gain of the variable gain amplifier 80 becomes large, and therefore, the luminance of the video signal from the solid-state image sensor 24 becomes large and reaches a point P shown in FIG. 14 soon. At this time, since the high level is outputted from the operational amplifier 82, the infrared LED 50 is lighted. Thus, since the gain of the variable gain amplifier 80 becomes the largest and the infrared LED 50 is lighted at a point P, the luminance of the video signal from the solid-state image sensor 24 becomes the largest, and therefore, the state is transferred to the point Q shown in FIG. 14.

If the resistance value of the variable resistor 78a is made smaller by rotating the luminance adjusting knob 78 from the above described state, the output of the operational amplifier 82 does not become the low level rapidly and is maintained at the high level Therefore, the infrared LED 50 is maintained in the lighted state, and therefore, only the gain of the variable gain amplifier 80 is decreased, in response thereto, the luminance of the video signal inputted to the interface 30 becomes smaller. Thereafter, as the resistance value of the variable resistor 78a is continued to be smaller, the output of the operational amplifier 82 becomes the low level at a point R shown in FIG. 14, and at this time, the infrared LED 50 is cut-off. Thus, since the gain of the variable gain amplifier 80 becomes the smallest and the infrared LED 50 is cut-off at the point R, the luminance of the video signal from the solid-state image sensor 24 becomes the smallest and thus the state is transferred to the point O shown in FIG. 14 again.

In accordance with the embodiment, only by operating the luminance adjusting knob 78, it is possible to simultaneously implement the control of the light amount of the exposure light from the infrared LED 50, that is, the light source 20 and the adjustment of the luminance level of the video signal from the solid-state image sensor 24, therefore, it is possible to adjust the luminance level being inputted from the interface 30 within a wide range from the point O to the point Q shown in FIG. 14.

In addition, in the above described embodiment, the infrared LED 50 is lightened or cut-off by electrically detecting the resistance of the variable resistor 78a, that is, a position of the knob 78; however, instead of such an electrical detecting means, a position of the knob 78, that is, a sliding contact of the variable resistor 78a may be mechanically detected.

Figure 15:
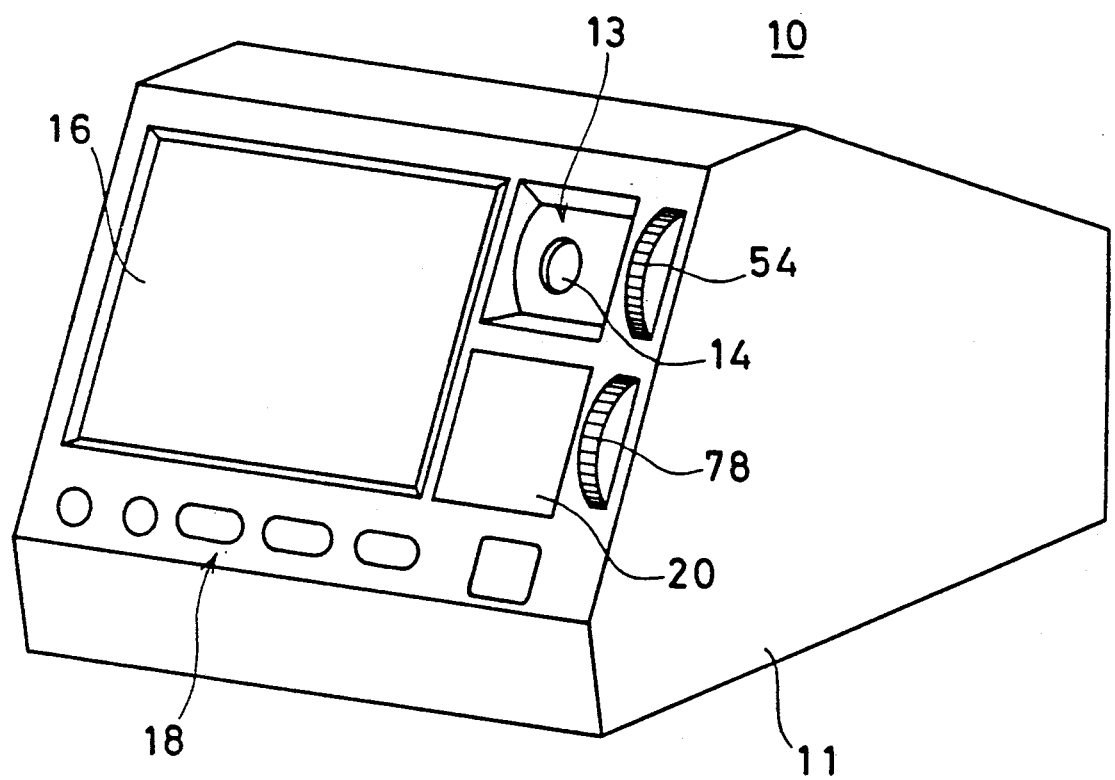
FIG. 15 is a perspective view showing the other embodiment in accordance with the present invention.

FIG. 15 is a perspective view showing the other embodiment in accordance with the present invention. This embodiment includes a housing 11 a shape of which is different from that of the previous embodiment as shown in FIG. 1 or FIG. 12. Then, the camera 14 and the infrared LED 50 are amounted on the circuit board 58 in the embodiment shown in FIG. 5 and FIG. 6; however, in FIG. 15 embodiment, the camera 14 and the light source 20 are separated from each other.

Figure 16:
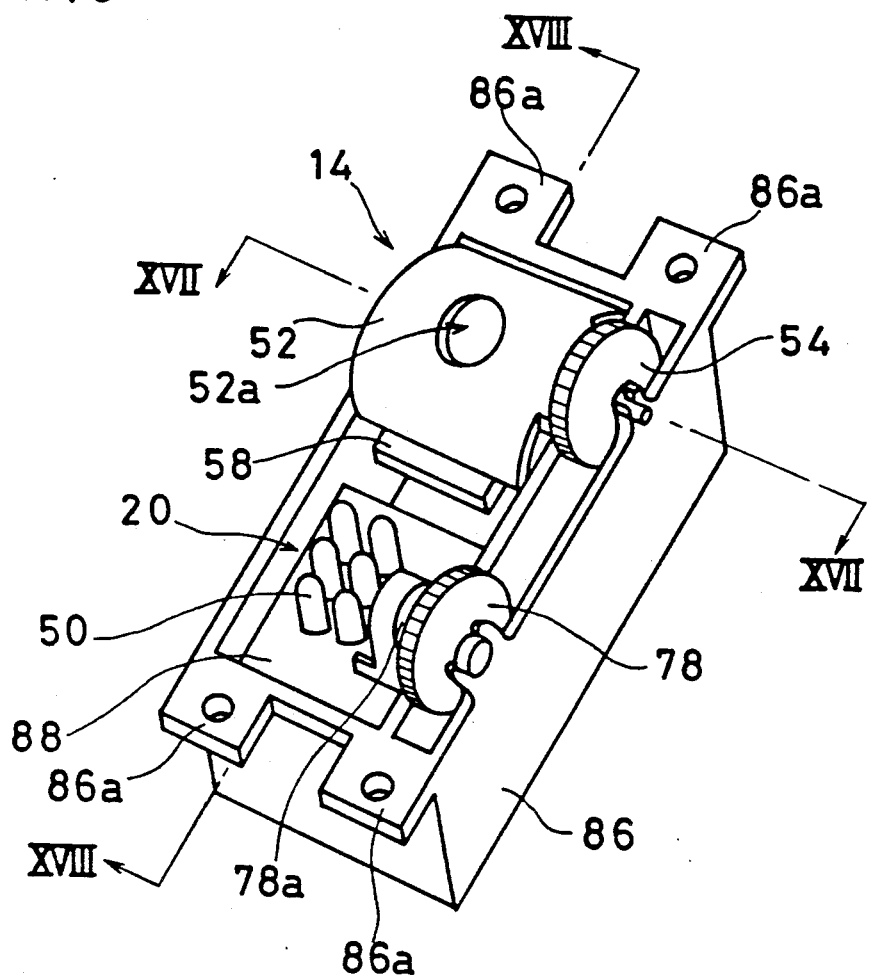
FIG. 16 is a perspective view showing a measure portion of FIG. 15 embodiment.
Figure 17:
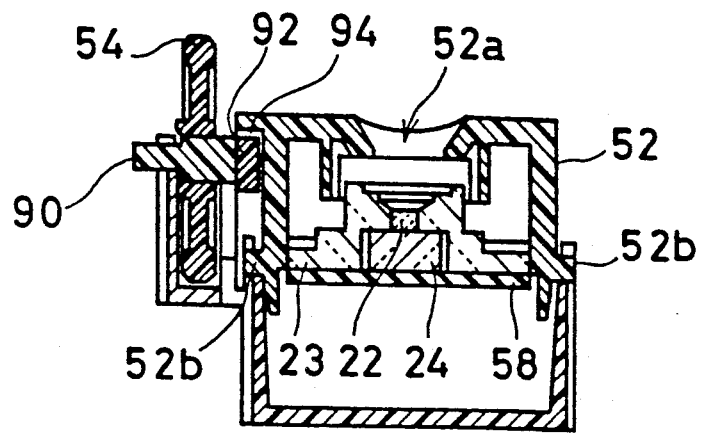
FIG. 17 is an illustrative cross-sectional view of FIG. 16 along a line XVII—XVII.
Figure 18:
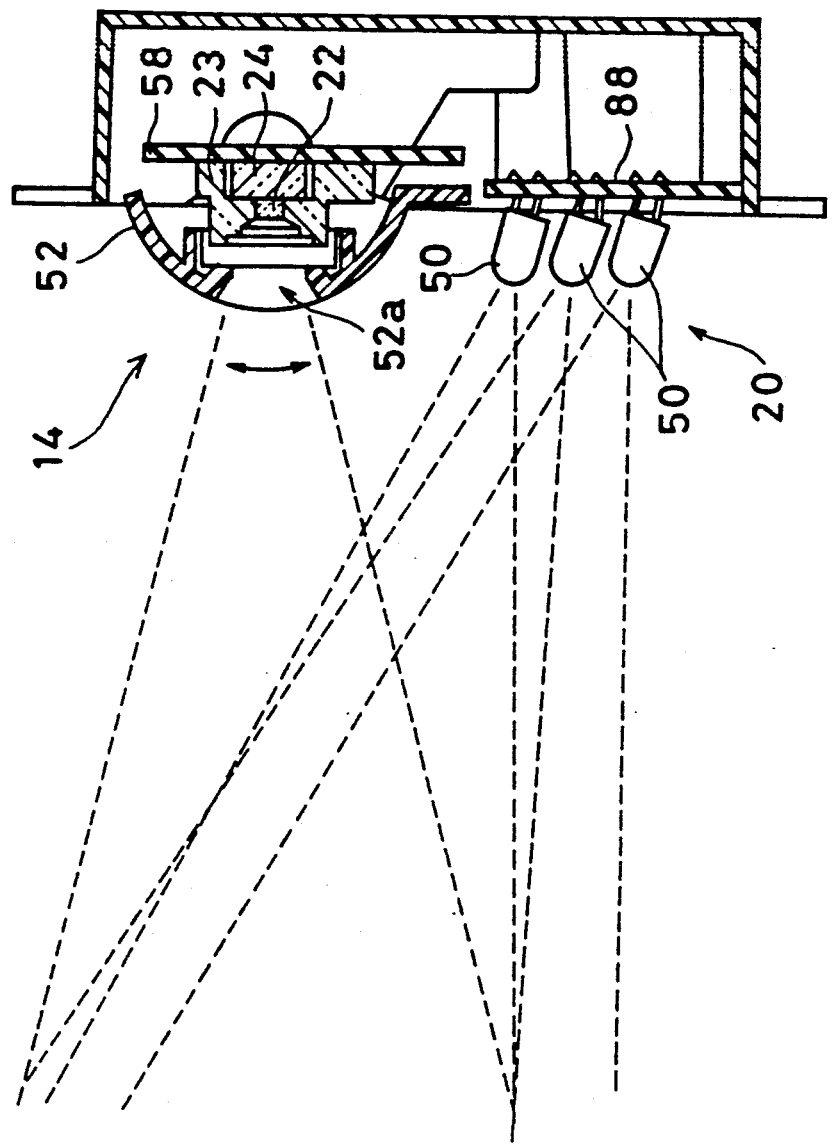
FIG. 18 is an illustrative cross-sectional view of FIG. 16 along a line XVIII—XVIII.

More specifically, as shown in FIG. 16–FIG. 18, the camera 14 is, as similar to the previous embodiments, fixed on the circuit board 58 which is fixed to the rotatable holder 52. The camera 14 includes the solid-state image sensor 24 mounted on the circuit board 58 and the lens system 22 positioned by a lens system holder 23, and the lens system 22 is faced to the opening 52a of the rotatable holder 52. Then, shafts 52b and 52b formed at the both sides of the rotatable holder 52 are rotatably supported by a casing 86, and therefore, the camera 14 is attached rotatably with respect to the casing 86.

In addition, in this embodiment, the rotatable holder 52 may be a resin-molded unit of a non-transparent.

The knob 54 is rotatably provided on the casing 86, and a pinion 92 is formed on a rotary shaft 90 (FIG. 17) of the knob 54, which bites with a rack 94 formed along a curved surface of the rotatable holder 52. Therefore, when the knob 54 is rotated, by a cooperation of the pinion 92 and the rack 94, the rotatable holder 52, that is, the camera 14 is rotated, whereby the angle of the declination or elevation of the camera 14 is changed.

Furthermore, the light source 20 is fixedly attached to the casing 86. A further circuit board 88 separated from the circuit board 58 for the camera 14 is fixed to the casing, a plurality of infrared LEDs 50, a luminance adjusting knob 78 and a variable resistor 78a connected thereto are mounted on the further circuit board 88. Then, as similar to FIG. 13 circuit, by rotating the luminance adjusting knob 78, the luminance level of the video signal from the camera 14 which is inputted to the interface 30 can be adjusted.

Thus, after attachment of the camera 14 and the light source 20 to the casing 86, the irradiating direction of the infrared light from the infrared LEDs 50 is adjusted such that even if the camera 14 is rotated, the infrared LEDs 50 included in the light source 20 can expose the whole of the range capable of being taken by the camera 14 in the vicinity of the focal distance of the camera 14. Then, after such an adjustment, a flange 86a of the casing 86 is fixed to the inside the housing as shown in FIG. 15.

In the embodiment as shown in FIG. 15-FIG. 18, by rotating the knob 54, the angle of declination or elevation of the camera 14 can be adjusted. At this time, only the circuit board 58 for the camera 14 is rotated by the knob 54, and therefore, in comparison with the embodiment wherein the camera 14 and the infrared LED 50 are mounted on the same circuit board as shown in FIG. 6, the space for rotating the camera 14 and thus the whole size of the apparatus can be minimized. In addition, since the infrared LEDs 50 are adjusted such that the infrared light can expose the whole of the rotational range of the camera 14, if the angle of declination or elevation of the camera 14 is changed, the light amount of the exposure light does not become insufficient In addition, in this embodiment shown, the light source composed of a combination of the incandescent electric lamp and the infrared filter as shown in FIG. 9 can be utilized Although the present invention has been described and illustrated in detail, it is clearly understood that the same is by way of illustration and example only and is not to be taken by way of limitation, the spirit and scope of the present invention being limited only by the terms of the appended claims.

What we claimed is:

1. A video telephone, comprising:
   a video camera;
   transmitting means for transmitting an image taken by said video camera through a network line;
   receiving means for receiving the image through said network line;
   displaying means cooperating with said receiving means for displaying a still picture and for displaying a moving picture based upon the image taken by said video camera;
   light source means for exposing an area in front of said video camera; and
   lighting control means for controlling timing of lighting of said light source means, said lighting control means including a means for lighting said light source means when the image taken by said video camera is displayed on said displaying means in a manner of said moving picture, said lighting control means including means for giving a lighting signal to said light source means when an amount of external light becomes insufficient.

2. A video telephone in accordance with claim 1, further comprising luminance adjusting means for adjusting a luminance of the image from the video camera.

3. A video telephone in accordance with claim 1, wherein said light source means includes an infrared light emitting element.

4. A visible telephone in accordance with claim 3, wherein said infrared light emitting element includes an infrared LED.

5. A visible telephone in accordance with claim 3, wherein said infrared light emitting element includes a combination of a incandescent electric lamp and infrared light transmissive filter.

6. A visible telephone in accordance with claim 3, wherein said video camera includes a lens system having an F value of "2.0 or more" and a solid-state image sensor for converting a light image from said lens system into a video signal.

7. A video telephone, comprising:
   a video camera having an aperture;
   transmitting means for transmitting an image taken by said video camera through a network line;
   receiving means for receiving an image transmitted through said network line;
   a display having a screen for displaying at least the image received by said receiving means;
   a main body having one side surface which faces an object to be taken by said video camera, said main body accommodating said video camera and said display so that said aperture and said screen are oriented with said one side surface, respectively;
   first holding means attached to said main body to be movable thereon for holding said video camera in a manner so that a direction to which said aperture of said video camera is directed is changeable; and
   direction changing means for acting on said first holding means and for changing a direction to which said aperture of said video camera is directed, said direction changing means including a knob rotatable in a plane, said knob being mechanically connected to said first holding means and being accessible from outside of said main body, said aperture changing direction in response to rotation of said knob, said aperture being spaced away from said plane.

8. A video telephone in accordance with claim 7, wherein said light source includes an infrared light emitting elements.

9. A video telephone in accordance with claim 8, wherein said infrared light emitting element includes an infrared LED.

10. A video telephone in accordance with claim 8, wherein said infrared light emitting element includes a combination of an incandescent electric lamp and an infrared light transmissive filter.

11. A video telephone, comprising:
a video camera;
transmitting means for transmitting an image taken by said video camera through a network line;
receiving means for receiving the image through said network line;
displaying means cooperating with said receiving means for displaying a still picture and for displaying a moving picture based upon the image taken by said video camera;
light source means for exposing an area in front of said video camera; and
lighting control means for controlling timing of lighting of said light source means, said lighting control means including circuit current detecting means for detecting a current flowing in said network line.

12. A video telephone in accordance with claim 11, wherein said light source means includes an infrared light emitting element.

13. A video telephone in accordance with claim 12, wherein said infrared light emitting element includes an infrared light emitting diode.

14. A video telephone in accordance with claim 12, wherein said infrared light emitting element includes a combination of an incandescent electric lamp and infrared light transmissive filter.

15. A video telephone in accordance with claim 11, wherein said video camera includes a lens system having an F value of at least 2.0 and a solid-state image sensor for converting a light image from said lens system into a video signal.

16. A video telephone, comprising:
a video camera;
transmitting means for transmitting a signal indicative of an image taken by said video camera through a network line;
receiving means for receiving the image through said network line;
displaying means cooperating with said receiving means for displaying a still picture and for displaying a moving picture based upon the image taken by said video camera;
light source means for exposing an area in front of said video camera;
lighting control means for controlling a timing of lighting of said light source means; and
luminance adjusting means for adjusting a luminance of the image from the video camera, said luminance adjusting means including a variable gain amplifier for amplifying the signal of the image and a variable resistor for changing a gain of said variable gain amplifier which adjusts the luminance of the image, said lighting control means including means for lighting and for cutting-off said light source means in accordance with a resistance value of said variable resistor.

17. A video telephone, comprising:
a video camera;
transmitting means for transmitting a signal indicative of an image taken by said video camera through a network line;
receiving means for receiving the image through said network line;
displaying means cooperating with said receiving means for displaying a still picture and for displaying a moving picture based upon the image taken by said video camera;
light source means for exposing an area in front of said video camera;
lighting control means for controlling a timing of lighting of said light source means; and
luminance adjusting means for adjusting a luminance of the image from the video camera, said luminance adjusting means including a variable gain amplifier for amplifying the signal of the image and a variable resistor for changing a gain of said variable gain amplifier which adjusts the luminance of the image, said lighting control means including means for lighting and for cutting-off said light source means in accordance with a resistance value of said variable resistor, said means for lighting and for cutting-off said light source means including a hysteresis circuit which lights said light source means at a first position of a sliding contact of said variable resistor when the luminance is increased by said variable resistor and cuts-off said light source means at a second position of the sliding contact of said variable resistor when the luminance is decreased by said variable resistor.

18. A video telephone comprising:
a video camera;
transmitting means for transmitting an image taken by the video camera through a network line;
receiving means for receiving the image through the network line;
a display for displaying at least the image received by the receiving means;
a main body;
first holding means fixed to said main body for holding said video camera so that a direction to which an aperture of the video camera is directed is changeable;
a light source for exposing in front of the aperture of the video camera; and
means for driving said light source only when an image is to be taken by said video camera.

19. A video telephone, comprising:
a video camera having an aperture;
transmitting means for transmitting an image taken by said video camera through a network line;
receiving means for receiving an image transmitted through said network line;
a display having a screen for displaying at least the image received by said receiving means;
a light source having a light beam which can be directed to an object to be taken by said video camera;
a main body having one side surface which faces said object to be taken by said video camera, said main body accommodating said video camera, said display and said light source so that said aperture, said screen and said light beam are oriented with said one side surface, respectively;
first holding means attached to said main body to be movable thereon for holding said video camera in a manner so that a direction to which said aperture of said video camera is directed is changeable; and
second holding means attached to said main body to be movable thereon for holding said light source in a manner so that an irradiating direction of said light beam from said light source is changeable, said first holding means and second holding means including common holding means for changing a direction to which said aperture of said video camera is directed and for changing an irradiating direction to which said light beam of said light source is directed with respect to said main body in accordance with said change in said direction of said aperture.

20. A video telephone, comprising:
a video camera having an aperture;
transmitting means for transmitting an image taken by said video camera through a network line;
receiving means for receiving an image transmitted through said network line;
a display having a screen for displaying at least the image received by said receiving means;
a light source having a light beam which can be directed to an object to be taken by said video camera;
a main body having one side surface which faces said object to be taken by said video camera, said main body accommodating said video camera, said display and said light source so that said aperture, said screen and said light beam are oriented with said one side surface, respectively;
first holding means attached to said main body to be movable thereon for holding said video camera in a manner so that a direction to which said aperture of said video camera is directed is changeable; and
direction changing means for acting on said first holding means and for changing a direction to which said aperture of said video camera is directed, said direction changing means including a knob rotatable in a plane, said knob being mechanically connected to said first holding means and being accessible from outside of said main body, said aperture changing direction in response to rotation of said knob, said aperture being spaced away from said plane.

21. A video telephone, comprising:
a video camera;
transmitting mean for transmitting an image taken by the video camera through a network line;
receiving means for receiving the image through the network line;
a display for displaying at least the image received by the receiving means;
a main body;
first holding means fixed to said main body for holding said video camera in a manner so that a direction to which an aperture of the video camera is directed is changeable;
a light source for exposing an area in front of the aperture of the video camera; and
means for adjusting a direction of said light source so that the direction of the light from said light source is coincident with a range which may be taken by said video camera even if said video camera changes in position.

22. A video telephone in accordance with claim 21, wherein said light source includes an infrared light emitting element.

23. A video telephone in accordance with claim 22, wherein said infrared light emitting element includes an infrared light emitting diode.

24. A video telephone in accordance with claim 22, wherein said infrared light emitting element includes a combination of an incandescent electric lamp and an infrared light transmissive filter.

* * * * *